United States Patent [19]

Yamashita et al.

[11] 3,764,755

[45] Oct. 9, 1973

[54] AUTOMATIC TRACKING SYSTEM FOR MAGNETIC VIDEO RECORDING AND REPRODUCING DEVICES

[75] Inventors: Yasushi Yamashita; Kenji Kimura; Masao Ishikura, all of Tokyo, Japan

[73] Assignee: Shiba Electric Co., Ltd., Tokyo, Japan

[22] Filed: Sept. 15, 1971

[21] Appl. No.: 180,663

[30] Foreign Application Priority Data

Sept. 18, 1970 Japan ............................ 45/81210

[52] U.S. Cl. ........................................ 179/100.2 S

[51] Int. Cl. ........................................ G11b 15/52

[58] Field of Search .............. 179/100.2 S, 100.2 T; 178/6.6 P; 318/314, 318; 331/25; 307/235; 328/135

[56] References Cited

UNITED STATES PATENTS

| | | | |
|---|---|---|---|
| 3,206,665 | 9/1965 | Burlingham | 318/314 |
| 3,659,208 | 4/1972 | Fussell | 307/235 |
| 3,495,208 | 2/1970 | Grada | 318/314 |
| 3,643,012 | 2/1972 | Clark et al. | 178/6.6 P |
| 3,176,208 | 3/1965 | Gifft | 318/318 |
| 3,495,184 | 2/1970 | Perkins et al. | 331/25 |

*Primary Examiner*—Vincent P. Canney
*Assistant Examiner*—Jay P. Lucas
*Attorney*—Chittick, Pfund, Samuels & Gauthier

[57] ABSTRACT

The automatic tracking system comprises a circuit including a synchronous three value delta modulator for detecting the maximum value of the signal reproduced from the magnetic tape of the magnetic video recording and reproducing device, a reversible counter for adding or subtracting the signal detected by the circuit, memory means for storing the maximum value of the count of the reversible counter, a digital-analogue converter for converting the stored digital quantity into an analogue quantity, and means responsive to the analogue quantity to adjust the phase of a signal for a capstan driving motor for adjusting the automatic tracking control.

3 Claims, 7 Drawing Figures

INVENTORS

KENJI KIMURA
MASAO ISHIKURA
YASUSHI YAMASHITA
BY Chittick, Pfund, Birch, Samuels & Gauthier
ATTORNEY

INVENTORS

KENJI KIMURA
MASAO ISHIKURA
YASUSHI YAMASHITA

BY Chittick, Pfund, Birch, Samuels & Gauthier
ATTORNEY

INVENTORS
KENJI KIMURA
MASAO ISHIKURA
YASUSHI YAMASHITA
BY Chittick, Pfund, Birch, Samuels & Gauthier
ATTORNEY INVENTORS
KENJI KIMURA
MASAO ISHIKURA
YASUSHI YAMASHITA
BY Chittick, Pfund, Birch, Samuels & Gauthier
ATTORNEY

AUTOMATIC TRACKING SYSTEM FOR MAGNETIC VIDEO RECORDING AND REPRODUCING DEVICES

BACKGROUND OF THE INVENTION

This invention relates to an automatic tracking system at the time of reproducing video signals from a video tape recorder employing a rotary head. In the operation of a video tape recorder, it is necessary to maintain a constant relationship between the angular position of a video head which is rotated with a head drum and the longitudinal position of a recording tape which is advanced by the rotation of a capstan driving motor. Usually, the capstan servo-system operates to interlock, at a definite relation, the rotation of the capstan driving motor with the rotation of the head drum driving motor.

FIG. 1 shows one example of a tape drive control system of the type described above at the time of recording. During recording, a 60 $H_z$ signal produced by reducing to one-fourth the frequency of a 240 $H_z$ signal (hereinafter called as the TACH signal) synchronized with the rotation of a rotary head 2 by means of a frequency divider 6 is used as the driving signal for the capstan driving motor. This 60 $H_z$ signal is applied to capstan driving motor 4 through an amplifier 7 to drive a magnetic tape 1. The TACH signal is converted into a sine wave signal by the operation of a recording circuit 5 and is then recorded on the lower edge of magnetic tape 1 by a stationary head 3.

For reproduction, a capstan servo-system as shown in FIG.2 is generally used. The TACH signal which has been recorded on the lower edge (hereinafter called as the control track) of the magnetic tape during recording, or the control track signal is reproduced by stationary head 3. The reproduced control signal is applied to a phase comparator 11 through an amplifier 9 and a phase shifter 10 for adjusting the tracking. The TACH signal is also applied to the phase comparator 11 as a reference signal so that phase difference between the reproduced control signal and the reference signal is detected. The output from the phase comparator 11 controls the oscillation frequency of a variable frequency oscillator 12 and the output thereof is supplied to capstan driving motor 4 through amplifier 7 and a frequency divider 13 which reduces the frequency to one-fourth. As a result, during reproduction the video head scans the same track on the magnetic tape as that has been recorded with video signals. When reproducing the video signal with a servo-system as shown in FIG. 2, it is necessary to make maximum the amplitude of the signal reproduced by the video head by interposing phase shifter 10 between control head 3 and comparator 11 so as to adjust the position of the magnetic tape relative to the video head in accordance with the quantity of phase shift. Adjustment of the level of the signal reproduced by the video head to the maximum value is essential to drive the tape while maintaining the best tracking condition, so that it is necessary to supervize the level of the signal reproduced by the video head during reproduction.

SUMMARY OF THE INVENTION

It is an object of this invention to provide a novel automatic tracking system for a 4 head video tape recorder which provides an automatic and precise tracking adjustment without the necessity of troublesome tracking adjustment as above described.

According to this invention there is provided an automatic tracking system for a magnetic video recording and reproducing device comprising a circuit including a synchronous three value delta modulator for detecting the maximum value of the signal reproduced from the magnetic tape of the magnetic video recording and reproducing device, a reversible counter for adding or subtracting the signal detected by the circuit, memory means for storing the maximum value of the count of the reversible counter, a digital-analogue converter for converting the stored digital quantity into an analogue quantity, and means responsive to the analogue quantity to adjust the phase of a signal for a capstan driving motor for adjusting the automatic tracking control.

BRIEF DESCRIPTION OF THE DRAWINGS

Further objects and advantages of the present invention will become apparent and the invention will be better understood from the following detailed description, reference being made to the accompanying drawings, in which.

DESCRIPTION OF THE PREFERRED EMBODIMENTS

Figure 3:
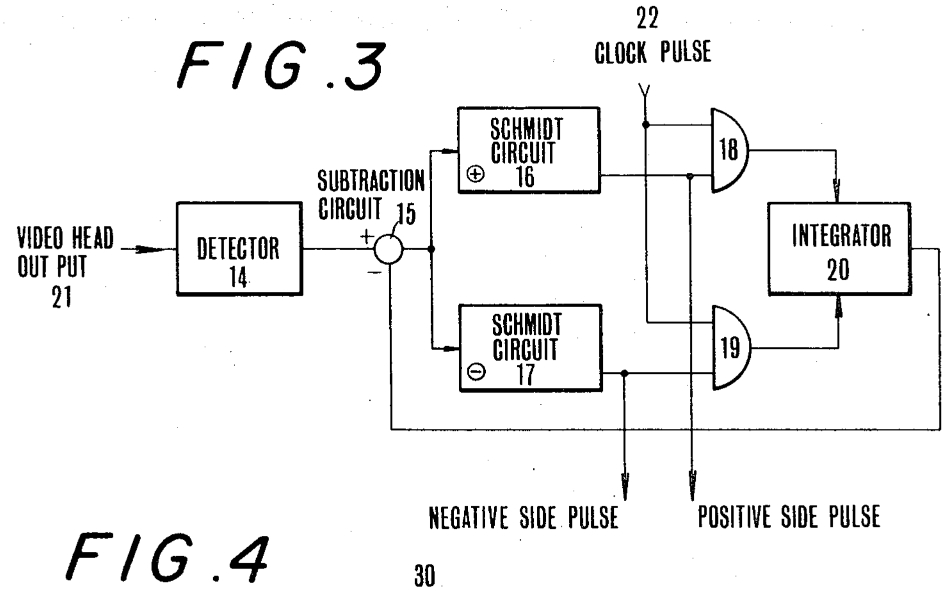
FIG. 3 is a block diagram of a maximum value detecting circuit utilized in this invention.

As above described, according to this invention a synchronous type three value delta modulator is used. FIG. 3 shows a block diagram of a maximum value detecting circuit utilizing such a modulator. The output signal 21 from the video head is rectified by a detector 14 to produce a DC signal corresponding to the magnitude of the output signal from the video head. This DC output signal is compared with the output level of an integrator 20 by a subtraction circuit 15. When the output from the subtraction circuit 15 exceeds a positive threshold value, a Schmidt circuit 16 produces an output pulse which is applied to a gate circuit 18 to apply a clock pulse 22 to the integrator 20. The clock pulse 22 is integrated in the negative direction by the integrator. On the other hand, when the output from the substraction circuit 15 exceeds a negative threshold value, another Schmidt circuit 17 produces an output pulse which enables another gate circuit 19 to integrate the clock pulse in the positive direction by the integrator.

Figure 1:
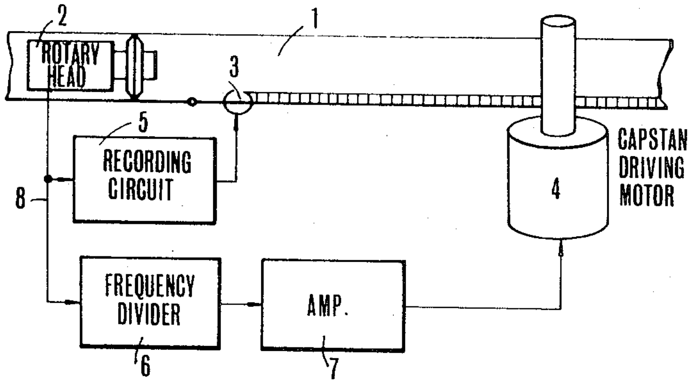
FIG. 1 and 2 are block diagrams to explain the principle of a prior art servo-system for driving a magnetic tape.
Figure 2:
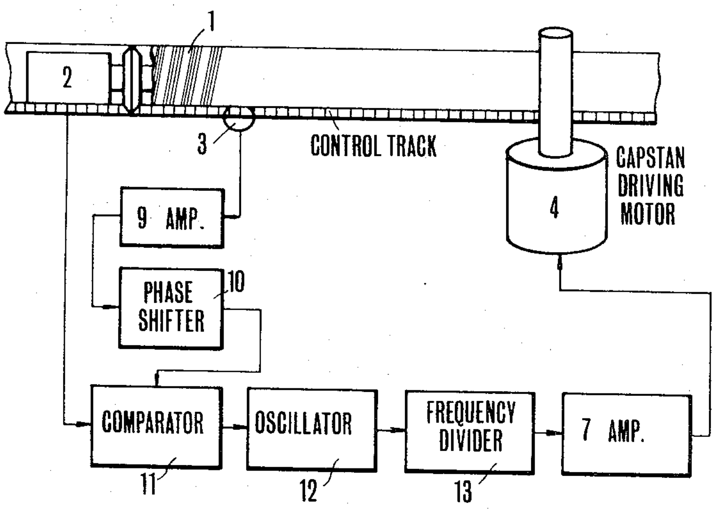

When the degree of phase shift provided by the phase shifter 10 shown in FIG. 2 is gradually varied,the output from the detector 14 varies with the variation in the output reproduced by the video head 3 as shown in FIG. 6A. The output of integrator 20 is shown by FIG. 6B whereas the output (hereinafter designated as the positive side pulse) of Schmidt circuit 16 which detects the positive threshold value is shown by FIG. 6C. The output (hereinafter designated as the negative side pulse) of Schmidt circuit 17 is shown by FIG. 6D.

Figure 4:
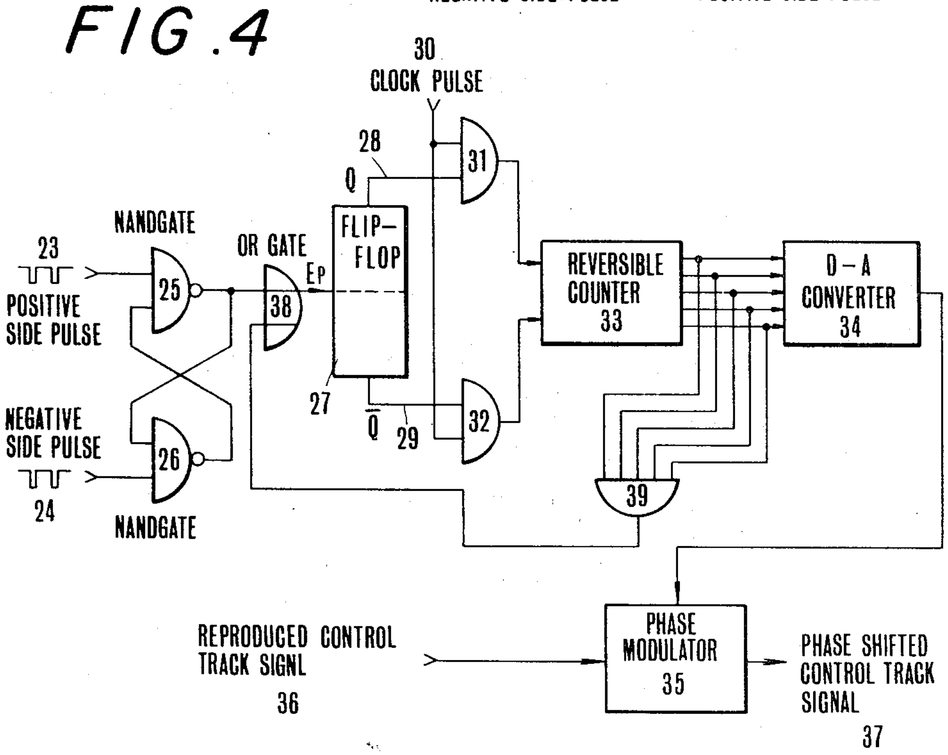
FIG. 4 shows a block diagram of the novel circuit for the automatic tracking mode.
Figure 5:
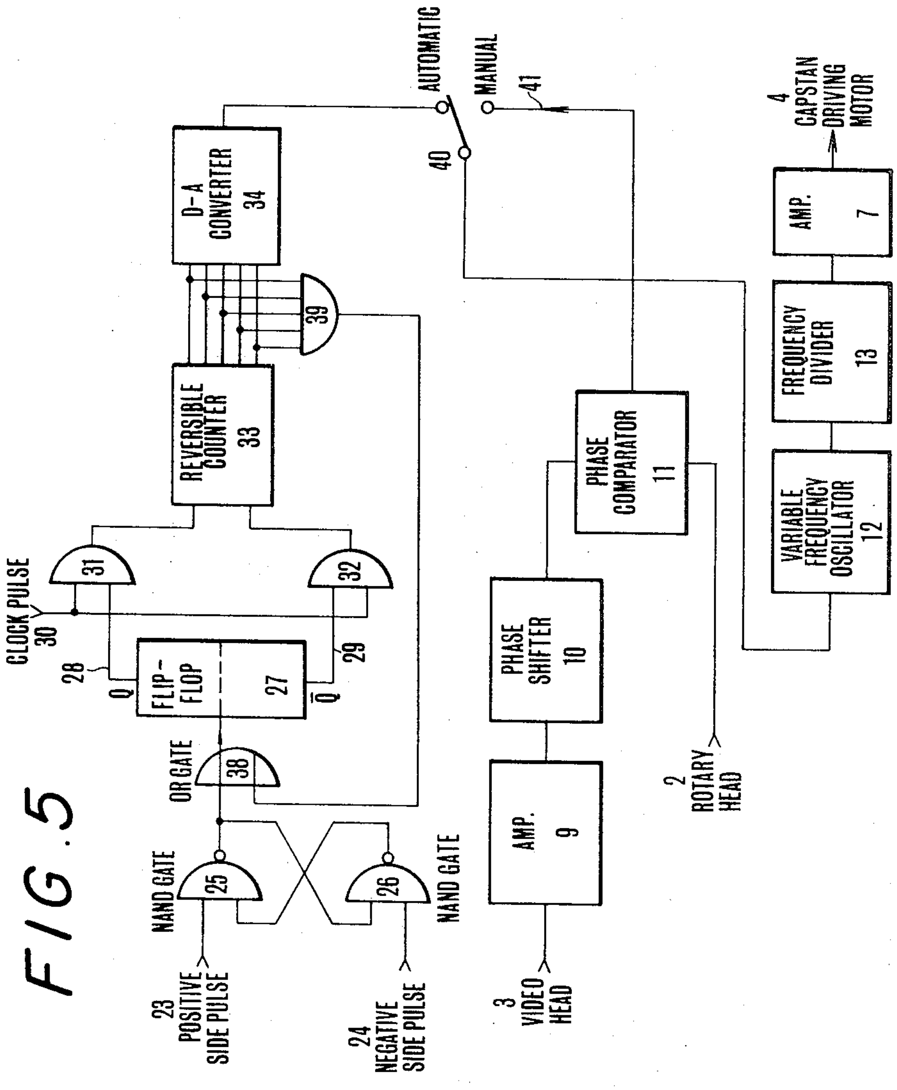
FIG. 5 shows a block diagram of a modification of the circuit shown in FIG. 4 capable of switching between the automatic tracking mode and the manual tracking mode.

FIGS. 4 and 5 are block diagrams of automatic tracking systems embodying the invention. In the embodiment shown in FIGS. 4 and 7, a pair of NAND gate circuits 25 and 26 cooperate to constitute a R-S flip-flop circuit which stores whether the condition in which the detector circuit 14 generates the positive side pulse or a negative side pulse. When a positive side pulse 23 shown in FIG. 6E is generated NAND gate circuit 25 provides a high level output and when the negative side pulse 24 shown in FIG. 6F is generated, NAND gate circuit 26 provides a high level output, whereas NAND gate circuit 25 a low level output. The output from NAND gate circuit 25 operates to trigger a flip-flop circuit 27 through an OR gate circuit 38. The operation of the flip-flop circuit 27 is reversed as the output from NAND gate circuit 25 varies from the high level to the low level. The outputs 28 and 29 of the opposite polarity from flip-flop circuit 27 are applied to AND gate circuits 31 and 32. Depending upon the condition of the flip-flop circuit 27 either one of the AND gate circuits 31 and 32 is enabled and the other is disenabled. The output from AND gate circuit 31 is appled to a reversible counter 33 to increase its counts whereas the output from AND gate circuit 32 is applied to the reversible counter to decrease its count. The output from the reversible counter 33 is applied to a digital-analogue (D-A) converter 34 to convert the output into an analogue quantity. An AND gate circuit 39 is provided to detect the saturation point of the reversible counter 33. When the saturation point is reached, AND gate circuit 39 produces an output pulse which is applied to flip-flop circuit 27 via OR gate circuit 38 to reverse the same. In this manner, the reversible counter 33 is switched from the addition operation to the subtraction operation or vice versa whenever a saturation point is reached so that the reversible counter is prevented from becoming over saturated. The output from D-A converter 34 is applied to a phase modulator 35 to regulate the degree of phase shift. Phase modulator 35 corresponds to phase shifter 10 in the conventional servo-system shown in FIG. 2 and operates to vary the phase of a reproduced control track signal 36,. thus producing a phase shifted control track signal 37.

In the modified embodiment shown in FIG. 5, the control signal generating circuit is identical to that shown in FIG. 4. The analogue output from D-A converter 34 is applied to a variable frequency oscillator 12 through the automatic contact of an automatic-manual transfer switch 40 to vary the frequency or phase of the output of the oscillator. In this case, the capstan servo-system is controlled independently of the reproduced control track signal. The variable frequency oscillator 12 is constructed such that its oscillation frequency is varied in accordance with the analogue (voltage) control signal. When the transfer switch 40 is thrown to the manual side, the output voltage from the phase comparator circuit 11 is varied in accordance with the variation in the phase of the control track signal to control the oscillation frequency. Thus, the rotational phase angle of the capstan driving motor is varied in accordance with the quantity which has varied the phase of the control track signal so as to vary the position of the tape with reference to the video head.

Figure 6:
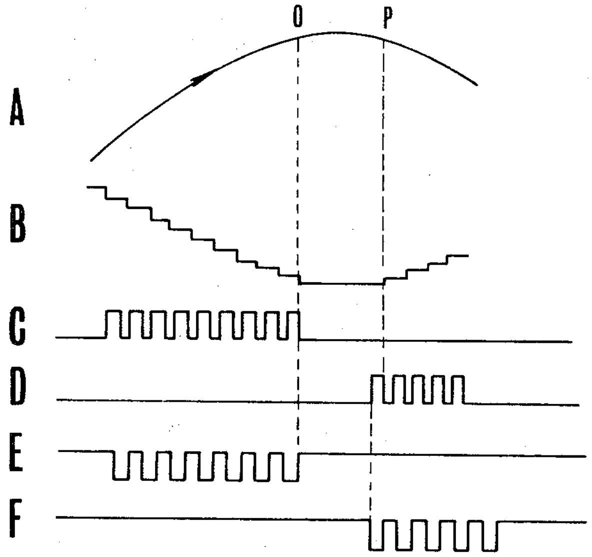
FIG. 6 shows waveforms to explain the operation of the maximum value detecting circuit and FIG. 7 shows an output waveform of a digital-analogue converter.
Figure 7:
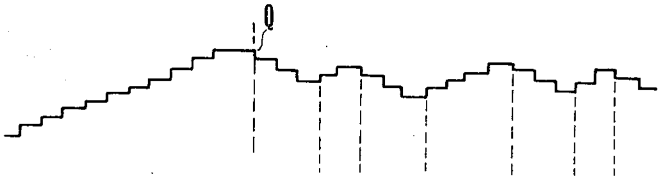

Consequently, it is possible to adjust the tracking control maximize the reproduced video head output by varying the phase of the control track signal. On the other hand, when the transfer switch 40 is thrown to the automatic side, the variable frequency oscillator 12 is controlled by the control signal generated by the circuit which detects the maximum value of the output reproduced by the video head and its memory circuit, that is the output voltage from D-A converter 34, thus always assuring a tracking control which maximize the output from the reproducing video head. As shown in FIG. 6 the positive side pulse is generated only when the level of the output from the reproducing video head is increasing whereas the negative side pulse is generated only when the output is decreasing. Since the NAND gate circuit 25 switches from a high level to a low level only when the negative side pulse is generated, the flip-flop circuit 27 reverses only when the output from the reproducing video head begins to decrease. Although the condition of the flip-flop circuit 27 is indeterminate at the instant when the VTR begins to reproduce, if it is assumed that the condition of the flip-flop circuit 27 is such that AND gate circuit 31 is enabled to operate reversible counter 33 to perform an addition operation so that the output waveform of detector 14 shown in FIG. 3 varies as shown in FIG. 6A, this output will reach a maximum value soon after it passes through point O. Then the level of the output from detector 14 begins to decrease after point P. However, concurrently therewith, the maximum value detecting circuit produces a negative side pulse which switches the output from NAND gate circuit 25 shown in FIGS. 4 and 5 from a high level to a low level thus reversing the operation of the flip-flop circuit 27. When it is assumed that the reversible counter 33 has been operated to perform an addition operation, the counter would perform a subtraction operation after the reversal. The output waveform of D-A converter 34 at this time is shown by a curve shown in FIG. 7. Point Q thereof shows the point of reversal of the flip-flop circuit. Since the output from D-A converter 34 operates to shift the phase to the original position by the phase modulator 35 from point Q shown in FIG. 7, the output level from detector 14 shown in FIG. 3 tends to increase to and then decrease from the maximum value. However, at an instant when the output begins to decrease, the flip-flop 27 again reverses its operation so that the reverse counter 33 repeats addition and subtraction operations as shown in FIG. 7. At this time, the output level of detector 14 varies between points O and P which are close to the maximum value as shown in FIG. 6A. Actually, however, the difference between the maximum value and the values at points P and O is negligibly small. By the operation of the circuit described above, automatic tracking is provided during reproduction. The transfer between automatic and manual operations is performed by transfer switch 40 shown in FIG. 5. More particularly, for the automatic tracking mode the switch is thrown to the automatic side whereas to the manual side for the manual tracking mode thus controlling the degree of phase shift provided by phase modulator 35 under the control of a manual control signal 41.

Although the invention has been shown and described in terms of some preferred embodiments thereof it will be clear that many changes and modifications will be obvious to one skilled in the art within the true spirit and scope of the invention as defined in the appended claims.

What is claimed is:

1. An automatic tracking system for a magnetic video recording and reproducing device including a capstan driving motor, said system comprising a circuit including a synchronous three value delta modulator for detecting the maximum value of the signal reproduced from the magnetic tape of said magnetic recording and reproducing device and for providing signals in accordance with whether the present reproduced signal occurs before or after said maximum value, a reversible counter, means for adding to or subtracting from the count of said counter in accordance with said signals, a digital-analogue converter for converting the count of said reversible counter into an analogue quantity, and means responsive to said analogue quantity to adjust the phase of a signal for the capstan driving motor for adjusting the automatic tracking control.

2. An automatic tracking system for a magnetic recording and reproducing device where a tape advanced by a capstan driving motor has recorded thereon video signals and a track signal, said system, comprising means for reproducing said track signal, a R-S flip-flop circuit responsive to the polarity of a signal produced by rectifying the reproduced video signal for producing a signal of a high level or a low level, a flip-flop circuit responsive to the output from said R-S flip-flop circuit, a reversible counter, a pair of gate circuits responsive to the output from said flip-flop circuit for operating said reversible counter in one direction or other, a D-A converter for converting the digital output from said reversible counter into an analogue quantity, and a phase modulator responsive to said analogue quantity to shift the phase of the reproduced track signal to operate the capstan driving motor of the device.

3. The automatic tracking system according to claim 2 which further includes an automatic-manual trasfer switch, a control circuit for controlling the capstan driving motor, and a circuit for providing a signal in accordance with the degree of phase shift between the control track signal and the video signals, said switch selectively connecting said control circuit to either the output of said D-A converter or the output of said signal-providing circuit.

* * * * *